Feb. 8, 1966  W. H. HULTGREN  3,233,737
DISPOSABLE FLUID FILTER
Filed March 13, 1963

INVENTOR.
WILLIAM H. HULTGREN
BY
Carlsen, Carlsen & Sturm
ATTORNEYS 3,233,737
DISPOSABLE FLUID FILTER
William H. Hultgren, Mount Carmel, Ill., assignor to Champion Laboratories, Inc., West Salem, Ill., a corporation of Connecticut
Filed Mar. 13, 1963, Ser. No. 264,918
7 Claims. (Cl. 210—434)

This invention relates generally to fluid filters and is more particularly related to fluid filters of the class which are intended to be disposed of, as a unit, as the self-contained filter material becomes filled with material removed from a fluid stream.

In the art with which my invention is concerned, it is common to provide a cartridge type of fluid filter which may be inserted in a fluid carrying line and which is intended to be disposed of, as a unit, when it no longer provides the necessary filtering action due to impregnation of the filtering medium with particles from fluid flow therethrough. Since the cartridge is intended to be disposed of as a unit, it is of utmost importance that the cost to the user be reduced to a minimum. Of course, the characteristics of a filter cartridge must be such as to provide adequate operation under normal expectant conditions and it is therefore incumbent on the suppliers of such cartridges to constantly improve such filter cartridges through improvements in material and through the use of materials and construction which will ultimately reduce the cost of the unit to the lowest possible value.

In the present invention, I provide a disposable fluid filter cartridge which is adapted to be inserted in a fluid carrying line and which is comprised of substantially fewer parts than previously thought necessary and which may be easily assembled to provide an inexpensive unit that may be economically and easily fabricated.

It is therefore an object of the present invention to provide a new and improved cartridge type of fluid filter.

Another object of the present invention is to provide an improved fluid filter which is of simple construction and easily manufactured.

A still further object of the present invention is to provide an improved fluid filter which may be easily assembled.

These and other more detailed and specific objects will be disclosed in the course of the following specification, reference being had to the accompanying drawings, in which—

Figure 1:
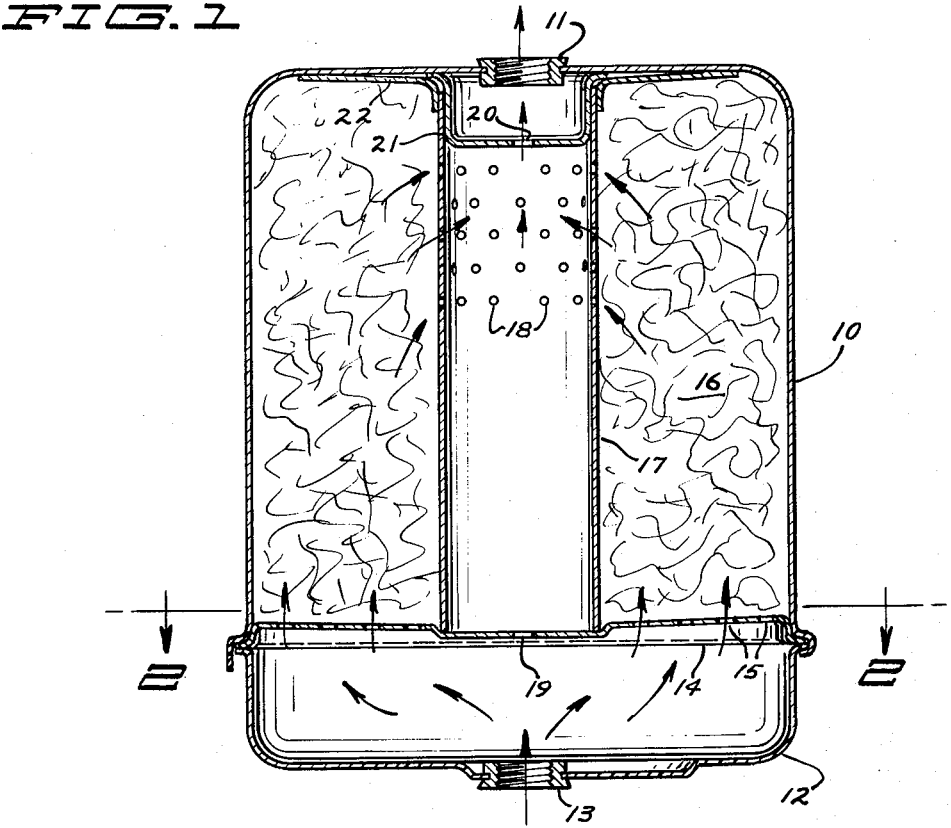
FIG. 1 is a side elevation sectional view of my invention.
Figure 2:
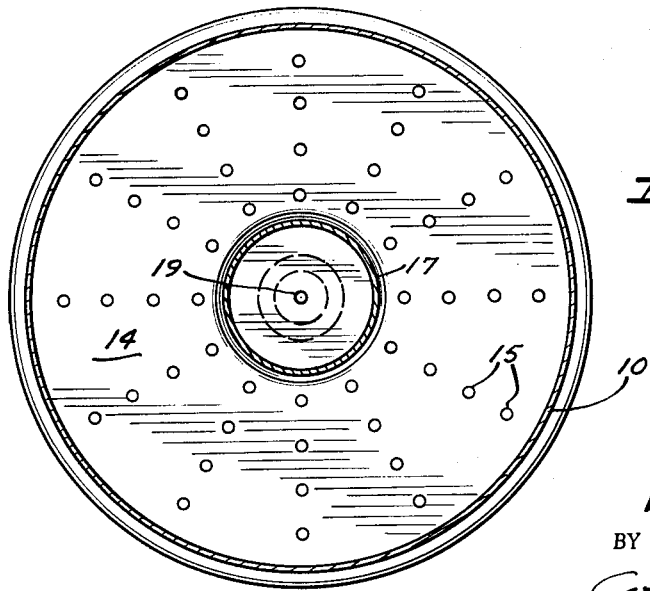
FIG. 2 is a sectional view taken along section lines 2—2 in FIG. 1.

Referring now to FIGS. 1 and 2 in which like reference characters have been applied to like elements, my invention is comprised of a generally cylindrically shaped housing member 10 having an outlet port member 11, positioned at the center of the closed end by suitable means such as welding, press fitting, spinning, and the like, for connection to a fluid system. Housing 10 is provided at its open end with an enlarged rim-like member which is adapted to be rolled over the remainder of the assembly to provide a fluid tight seam as shown at the top in FIG. 1. The lower part of the annularly enlarged portion at the open end of housing 10 is shown as it appears before final assembly of the cartridge assembly. Housing 10 is provided with a cover member 12 also having an inlet port member 13 positioned substantially at the center of the closed end for connection to a supply of fluid to be filtered and is mounted in place through suitable means, for example welding and the like. The direction of flow of fluid through the filter unit is as indicated by the arrows. Cover member 12 is provided with a radially extending annular flange at its open end for coaction with cover member 10 as indicated on the drawing.

The interior of the filter cartridge is divided into substantially three chambers which might be termed inlet and outlet chambers and a filter media chamber. An outlet chamber is provided on the inside of a tube member 17 which has a plurality of perforations 18 over a portion of its axial length which are intended to be positioned adjacent the outlet end of the cartridge assembly. A cup-shaped member 21 having a radially extending annular flange at its open end and an orifice 20 at its closed end is carried on the inside of tube 17 in proximity to outlet port member 11. The other end of the outlet chamber is formed by the center portion of a plate member 14 having a centrally located orifice 19 and a plurality of perforations 15 for purposes to be explained below. Plate member 14 is shown with a center portion adapted to coact with tube member 17 for engagement therewith to prevent lateral displacement of tube member 17 in the assembled filter cartridge. Plate member 14 is also provided with a radially extending annular flange which is adapted to coact with cover members 10 and 12 to provide an effective seal for the cartridge assembly. Plate member 14 defines an inlet chamber on the right end of FIG. 1 and a filter media chamber surrounding tube member 17 on the left end of the completed assembly. The filter chamber may be filled with suitable filtering material 16, for example, cotton waste or any other material having desirable mechanical, chemical, and physical properties for filtering any given fluid. It may be noted that a gasket member 22 is positioned at the left end of the unit in engagement with tube member 17 and cup-shaped member 21 and extends radially outwardly a considerable distance to provide a permeable seal to prevent the loss of any filter media that may find its way through the assembly. It may be noted that sealing member 22 is preferably of material which may be readily deformed and in the present embodiment is a washer-like configuration which has an inner diameter considerably less than that of tube 17 and an outer diameter considerably greater than tube member 17. The shape and other material which may be useful for this member will be readily apparent to those skilled in the art upon understanding the principles of my invention.

It may now be appreciated that the dimensions of the various members of which the filter cartridge assembly is comprised contribute materially to its stability and it may also be noted that the configurations of the various members contribute materially to a unit which is easily assembled. For example, the axial dimension of tube member 17 when engaged on cup member 21 is slightly greater than the inside axial distance between plate member 14 and the inside end of housing member 10. Thus, when the cartridge is assembled and the edges of the open end of housing member 10 are rolled over to provide the seal, a spring force is exerted axially along tube member 17 by the center of plate member 14 which is shown slightly dished out to illustrate this feature of my invention.

In assembling my device, it is unnecessary to utilize springs, jigs, and the like as the components thereof are easily positioned within housing 10, cover member 12 is applied, and the entire unit is then finished by one simple operation of rolling the edge of the opening on housing member 10. It may also be appreciated with an understanding of my invention that the usual spring member for holding a filter assembly in place within a cartridge assembly has been eliminated to not only reduce the ultimate expense of manufacture but to also reduce the operations and complexity of equipment which has heretofore been necessary in assembling such devices.

Orifice 20 is of greater diameter than orifice 19 and these are provided to allow leakage of some fluid so that if the filtering media 16 becomes clogged or otherwise inoperative a certain amount of fluid may pass through the filter to allow operation of the apparatus utilizing the fluid which normally passes through the cartridge assembly and to allow fluid to flow through the center of the cartridge when a system containing the cartridge is initially started. In one embodiment of my invention, housing members 10 and 12 were comprised of thin sheet metal drawn or stamped to the desired configuration, plate member 14, tube member 17, and cup member 21 were suitably formed of aluminum and sealing member 22 was comprised of a disc of cotton filtering material commonly referred to as a "milk disc" as might be used in the dairy industry.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A disposable fluid filter cartridge, comprising in combination:
   an elongated open ended cylindrical housing having an axially extending annularly enlarged portion surrounding the open end thereof and a port for connection to a fluid system at the center of the closed end;
   an open ended cylindrical cover member therefor having an annular radially extending flange portion surrounding the open end thereof dimensioned to be positioned within the enlarged portion of said housing and a port for connection to a fluid system on the closed end;
   a tube member of substantially less diameter than said housing, said tube member being perforated over a portion of its axial length and said perforated portion is disposed in proximity to the closed end of said housing;
   a cup member having a radially extending flange at one end and having an outside diameter along its axial length substantially that of the inside diameter of said tube member;
   sealing means surrounding the outside of the tube member and the radially extending flange on said cup member;
   fluid filtering media positioned intermediate said tube member and said housing;
   and a perforated plate member having a circular center portion adapted to engage and hold the end of said tube member against lateral movement and having an axially extending peripheral portion having an outside diameter the same as the inside diameter of said housing and a radial flange extending from said axially extending portion, said axially extending portion being dimensioned with respect to said housing and said tube whereby fluid sealing engagement of said radially extending flanges on said plate member and said cover member with the annularly enlarged portion on said housing securely positions said tube member intermediate the closed end of said housing and said plate member.

2. The subject matter of claim 1 in which the sealing member around the cup member and the tube member is comprised of an annular disc of permeable material having an outer diameter substantially greater than the tube member and an inner diameter substantially less than the tube member so that at least a portion of said disc will extend axially of the tube member.

3. A disposable fluid filter cartridge, comprising in combination:
   a two part cylindrical housing including inlet and outlet ports at the ends thereof;
   an open ended cylindrical member having perforations along a portion of its axial length, said perforations being disposed remotely from a partition member and in proximity to said outlet port;
   a cup shaped member, having a radially extending flange around the open end thereof, mounted inside one end of said cylindrical member;
   a partition member having an annular flange in engagement with said two part cylindrical housing, said member having a circular axially extending center portion adapted to engage said open ended cylindrical member at the end opposite from the perforations to prevent lateral movement and to bias said member into engagement with the end of said housing, said partition member also having a plurality of perforations outside of said center portion;
   a permeable member overlying the inside of the other end of said cylindrical member and said cup to prevent loss of filter media; and
   filtering media positioned around said cylindrical tube.

4. A disposable filter cartridge comprising:
   a two part cylindrical housing formed of a pair of housing members, each having a port for connection to a fluid system at the closed end thereof and being joined together at the open ends thereof;
   a flexible plate member, mounted at its periphery in the joint between said housing members, having a circular axially extending center portion for engaging and holding a tube member and having a plurality of perforations surrounding said center portion;
   a tube member positioned in engagement with the center portion of the plate member and substantially coaxially with said housing and having a plurality of perforations therein disposed remotely from said plate member and having an axial length whereby engagement with the center portion of said plate member axially displaces the center portion of said plate member, the inside of said tube member being disposed substantially concentrically of an outlet port in said housing and defining an outlet chamber, the annular volume around said tube member defining a filter chamber including filtering means disposed therein, and the end of said housing opposite said tube member comprising an inlet chamber.

5. The subject matter of claim 4 in which a permeable seal is positioned in sealing engagement with the end of the tube member and one end of the housing.

6. The apparatus of claim 1 in which the cup member and the plate member are provided with apertures to allow a limited amount of fluid to flow from the port in one of the cylindrical cover members to the port in the cylindrical housing.

7. The apparatus of claim 2 in which the cup member and the plate member are provided with centrally disposed apertures in fluid communication with the center tube member whereby a limited amount of fluid may flow from the port in the cover member to the port in the cylindrical housing.

References Cited by the Examiner

UNITED STATES PATENTS

| 276,179 | 4/1883 | Haynes | 210—445 |
| 2,349,174 | 5/1944 | Klinkhamer | 210—438 |
| 2,714,964 | 8/1955 | Radford | 210—439 |

REUBEN FRIEDMAN, *Primary Examiner.*

HERBERT L. MARTIN, *Examiner.*